United States Patent
Biswas

(10) Patent No.: US 12,518,768 B2
(45) Date of Patent: Jan. 6, 2026

(54) METHOD AND APPARATUS FOR PROCESSING OF AUDIO DATA USING A PRE-CONFIGURED GENERATOR

(71) Applicant: Dolby International AB, Dublin (IE)

(72) Inventor: Arijit Biswas, Schwaig bei Nuernberg (DE)

(73) Assignee: Dolby International AB, Dublin (IE)

( * ) Notice: Subject to any disclaimer, the term of this patent is extended or adjusted under 35 U.S.C. 154(b) by 232 days.

(21) Appl. No.: 18/256,967

(22) PCT Filed: Dec. 15, 2021

(86) PCT No.: PCT/EP2021/085852
§ 371 (c)(1),
(2) Date: Jun. 12, 2023

(87) PCT Pub. No.: WO2022/129146
PCT Pub. Date: Jun. 23, 2022

(65) Prior Publication Data
US 2024/0055006 A1 Feb. 15, 2024

Related U.S. Application Data

(60) Provisional application No. 63/126,594, filed on Dec. 17, 2020.

(30) Foreign Application Priority Data

Dec. 17, 2020 (EP) .................................... 20214888

(51) Int. Cl.
*G10L 19/008* (2013.01)
*G10L 25/30* (2013.01)

(52) U.S. Cl.
CPC ............ *G10L 19/008* (2013.01); *G10L 25/30* (2013.01)

(58) Field of Classification Search
CPC ..... G10L 19/008; G10L 25/30; G10L 19/005; G10L 19/26; G10L 21/0208; G06N 3/04
See application file for complete search history.

(56) References Cited

U.S. PATENT DOCUMENTS

| | | | | |
|---|---|---|---|---|
| 4,882,754 A | * | 11/1989 | Weaver | H03M 7/42 375/240 |
| 10,504,004 B2 | | 12/2019 | Kaufhold | |

(Continued)

FOREIGN PATENT DOCUMENTS

| | | |
|---|---|---|
| JP | 2023533427 A | 8/2023 |
| WO | 2019090213 A1 | 5/2019 |

(Continued)

OTHER PUBLICATIONS

Andrew Brock et al., "Large Scale GAN Training for High Fidelity Natural Image Synthesis", Arxiv.Org, Cornell University Library, 201 Olin Library Cornell University Ithaca, Ny 14853, Sep. 28, 2018 (Sep. 28, 2018), XP081088369, 35 pages.

(Continued)

*Primary Examiner* — Michael N Opsasnick

(57) ABSTRACT

Described herein is a method for setting up a decoder for generating processed audio data from an audio bitstream, the decoder comprising a Generator of a Generative Adversarial Network, GAN, for processing the audio data. The method involves pre-configuring the Generator for processing of audio data with a set of parameters for the Generator, the parameters being determined by training the Generator using the full concatenated distribution. The method involves pre-configuring the decoder to determine a truncation mode for modifying the concatenated distribution and to apply the determined truncation mode to the concatenated distribution. Also described are a method of generating processed audio data from an audio bitstream using the GAN for (Continued)

processing audio data and a respective apparatus, as well as respective systems and computer program products.

20 Claims, 7 Drawing Sheets

(56) References Cited

U.S. PATENT DOCUMENTS

| | | | |
|---|---|---|---|
| 10,504,268 B1 | 12/2019 | Huang | |
| 2006/0282665 A1* | 12/2006 | Zhu | H04N 7/1675 |
| | | | 713/160 |
| 2014/0169480 A1* | 6/2014 | Lachine | H04N 19/14 |
| | | | 382/246 |
| 2017/0006401 A1* | 1/2017 | Kropp | H04S 7/308 |
| 2019/0138847 A1 | 5/2019 | Shor | |
| 2019/0294972 A1 | 9/2019 | Keller | |
| 2019/0325887 A1 | 10/2019 | Karkkainen | |
| 2019/0355347 A1 | 11/2019 | Arik | |
| 2019/0378383 A1 | 12/2019 | Büttner | |
| 2020/0219486 A1* | 7/2020 | Fu | G10L 15/10 |
| 2024/0055006 A1* | 2/2024 | Biswas | G10L 25/30 |

FOREIGN PATENT DOCUMENTS

| | | | |
|---|---|---|---|
| WO | 2020047298 A1 | 3/2020 | |
| WO | 2021245015 A1 | 12/2021 | |

OTHER PUBLICATIONS

Arijit Biswas et al: "Audio Codec Enhancement with Generative Adversarial Networks", Arxiv.Org, Cornell University Library, 201 Olin Library Cornell University Ithaca, NY 14853, Jan. 27, 2020 (Jan. 27, 2020), XP081586255, 5 pages.

Daniel Michelsanti et al., "Conditional Generative Adversarial Networks for Speech Enhancement and Noise-Robust Speaker Verification" Interspeech Aug. 20-24, 2017, Stockholm, Sweden, Sep. 7, 2017, pp. 1-5, 5 pages.

Mohammadreza Soltani et al: "Learning Generative Models of Structured Signals from Their Superposition Using GANs with Application to Denoising and Demixing", Arxiv.org, Cornell University Library, 201 Olin Library Cornell University Ithaca, NY 14853, Feb. 12, 2019 (Feb. 12, 2019), XP081028448, 25 pages.

Santiago Pascual et al: "SEGAN: Speech Enhancement Generative Adversarial Network", INTERSPEECH 2017, Jun. 9, 2017 (Jun. 9, 2017), pp. 3642-3646, XP055579756, 5 pages.

T. Karras, S. Laine, and T. Aila, "A style-based generator architecture for generative adversarial networks," CVPR 2019, Cornell University, arXiv:1812.04948, Mar. 29, 2019, 12 pages.

Yan Wu et al., "LOGAN: Latent Optimisation for Generative Adversarial Networks " Dec. 2, 2019, pp. 1-19, 19 pages.

* cited by examiner

METHOD AND APPARATUS FOR PROCESSING OF AUDIO DATA USING A PRE-CONFIGURED GENERATOR

CROSS-REFERENCE TO RELATED APPLICATIONS

This application is a U.S. National Stage application under U.S.C. 371 of International Application No. PCT/EP2021/085852, filed 15 Dec. 2021 (reference: D19141WO01), which claims priority of the following priority applications: U.S. provisional application 63/126,594 (reference: D19141USP1), filed 17 Dec. 2020 and EP Application Serial No. 20214888.8 (reference: D19141EP), filed 17 Dec. 2020, which are hereby incorporated by reference.

TECHNOLOGY

The present disclosure relates generally to a method for setting up a decoder for generating processed audio data from an audio bitstream, the decoder comprising a Generator of a Generative Adversarial Network, GAN, for processing of the audio data, and, in particular, to pre-configuring the Generator and the decoder. The present disclosure relates further to a method of generating processed audio data from an audio bitstream using a Generator of a Generative Adversarial Network, GAN, for processing of the audio data. The present disclosure relates moreover to a respective apparatus, to respective systems and computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

During the last years, deep learning approaches have become more and more attractive in various fields of application, including speech enhancement. In general, recent work is based mostly on deep convolutional GANs (popularly known as DCGAN). Most of the deep learning approaches up to now relate to speech denoising. It is to be noted that the restoration of audio from coding noise is a challenging problem. Intuitively one may consider coding artifact reduction and de-noising to be highly related. However, removal of coding artifacts/noise that are highly correlated to the desired sounds appears to be more complicated than removing other noise types (in de-noising application) that are often less correlated. The characteristics of coding artifacts depend on the codec and the employed coding tools, and the selected bitrate.

In view of the above, there is still an existing need for improving deep-learning-based approaches. There is particular need for improving flexibility with regard to a trade-off between quality and variety.

SUMMARY

In accordance with a first aspect of the present disclosure there is provided a method for setting up a decoder for generating processed audio data from an audio bitstream, the decoder comprising a Generator of a Generative Adversarial Network, GAN, for the processing of the audio data, wherein the Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation. The method may include the step of (a) pre-configuring the Generator for processing of audio data with a set of parameters for the Generator, the parameters being determined by training, at training time, the Generator using the full concatenated distribution. And the method may include the step of (b) pre-configuring the decoder to determine, at decoding time, a truncation mode for modifying the concatenated distribution and to apply the determined truncation mode to the concatenated distribution.

In some embodiments, the decoder may be pre-configured to determine, at decoding time, the truncation mode for modifying the concatenated distribution out of two or more truncation modes.

In some embodiments, the two or more truncation modes may include a truncation mode of truncation off, a truncation mode of weak truncation, a truncation mode of intermediate truncation, and a truncation mode of strong truncation.

In some embodiments, in step (b) the decoder may be pre-configured to determine, at decoding time, the truncation mode based on audio content and/or bitstream parameters of the audio bitstream.

In some embodiments, the audio content may include one or more of applause, speech, music, and effects.

In some embodiments, the bitstream parameters may include one or more of an indication of a bit-rate and an indication of an audio codec type.

In some embodiments, in step (b) the decoder may be pre-configured to determine, at decoding time, the truncation mode of truncation off when the audio content includes applause.

In some embodiments, in step (b) the decoder may be pre-configured to determine, at decoding time, one of the truncation modes of weak truncation, intermediate truncation or strong truncation when the audio content includes speech, music and/or effects.

In some embodiments, in step (b) the decoder may be pre-configured to determine, at decoding time, the truncation mode of truncation off when the indication of the bit-rate indicates a low bit-rate.

In some embodiments, in step (b) the decoder may be pre-configured to determine, at decoding time, one of the truncation modes of weak truncation, intermediate truncation or strong truncation when the indication of the bit-rate indicates a high bit-rate.

In some embodiments, in step (b) the decoder may be pre-configured to determine the truncation mode based on an indication of a truncation mode that shall be used, the indication being included in metadata of the audio bitstream.

In some embodiments, applying the determined truncation mode to the concatenated distribution may include: applying a cut off to the concatenated distribution according to a truncation range to obtain a truncation region; and resampling all values outside the truncation region to lie inside the truncation region.

In some embodiments, the truncation mode of weak truncation may be set to apply a truncation range extending from −0.8 to +0.8.

In some embodiments, the truncation mode of intermediate truncation may be set to apply a truncation range extending from −0.5 to +0.5.

In some embodiments, the truncation mode of strong truncation may be set to apply a truncation range extending from −0.4 to +0.4.

In some embodiments, the full concatenated distribution may be a Gaussian distribution or a Laplace distribution.

In some embodiments, step (a) may include training the Generator using the full concatenated distribution.

In some embodiments, in step (a) the set of parameters for the Generator may be determined by training the Generator in a GAN setting including the Generator and a Discriminator, wherein the training may include the steps of:

(a) inputting an audio training signal into the Generator;
(b) generating, by the Generator, a processed audio training signal based on the audio training signal using the full concatenated distribution;
(c) inputting, one at a time, the processed audio training signal and a corresponding original audio signal, from which the audio training signal has been derived, into the Discriminator;
(d) judging, by the Discriminator, whether the input audio signal is the processed audio training signal or the original audio signal; and
(e) iteratively tuning the parameters of the Generator until the Discriminator can no longer distinguish the processed audio training signal from the original audio signal.

In some embodiments, during training the Generator the truncation mode of truncation off may be applied.

In accordance with a second aspect of the present disclosure there is provided a method of generating processed audio data from an audio bitstream using a Generator of a Generative Adversarial Network, GAN, for processing of the audio data, wherein the Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation. The method may include the step of (a) receiving the audio bitstream. The method may further include the step of (b) determining, by the decoder, a truncation mode. The method may further include the step of (c) inputting the audio data into the Generator for processing the audio data. The method may further include the step of (d) applying the determined truncation mode to the concatenated distribution to generate a truncated concatenated distribution. The method may further include the step of (e) processing the audio data by the Generator based on the truncated concatenated distribution. And the method may include the step of (f) obtaining the processed audio data as an output from the Generator.

In some embodiments, the method may further include core decoding the received audio bitstream.

In some embodiments, the truncation mode may be determined, by the decoder, out of two or more truncation modes.

In some embodiments, the two or more truncation modes may include a truncation mode of truncation off, a truncation mode of weak truncation, a truncation mode of intermediate truncation and a truncation mode of strong truncation.

In some embodiments, in step (b) the truncation mode may be determined, by the decoder, based on audio content and/or bitstream parameters.

In some embodiments, the audio content may include one or more of applause, speech, music, and effects.

In some embodiments, the bitstream parameters may include one or more of an indication of a bit-rate and an indication of an audio codec type.

In some embodiments, in step (b) the truncation mode of truncation off may be determined, by the decoder, when the audio content includes applause.

In some embodiments, in step (b) one of the truncation modes of weak truncation, intermediate truncation or strong truncation may be determined, by the decoder, when the audio content includes speech, music and/or effects.

In some embodiments, in step (b) the truncation mode of truncation off may be determined, by the decoder, when the indication of the bit-rate indicates a low bit-rate.

In some embodiments, in step (b) one of the truncation modes of weak truncation, intermediate truncation or strong truncation may be determined, by the decoder, when the indication of the bit-rate indicates a high bit-rate.

In some embodiments, in step (d) applying the determined truncation mode to the concatenated distribution may include: applying a cut off to the concatenated distribution according to a truncation range to obtain a truncation region; and resampling all values outside the truncation region to lie inside the truncation region.

In some embodiments, the truncation mode of weak truncation may be set to apply a truncation range extending from −0.8 to +0.8.

In some embodiments, the truncation mode of intermediate truncation may be set to apply a truncation range extending from −0.5 to +0.5.

In some embodiments, the truncation mode of strong truncation may be set to apply a truncation range extending from −0.4 to +0.4.

In some embodiments, the concatenated distribution may be a Gaussian distribution or a Laplace distribution.

In some embodiments, the audio bitstream may include metadata, wherein an indication of a truncation mode that shall be used by the decoder may be included in the metadata.

In accordance with a third aspect of the present disclosure there is provided an apparatus for generating processed audio data from an audio bitstream. The apparatus may include (a) a receiver for receiving the audio bitstream. The apparatus may further include (b) a determiner for determining a truncation mode.

The apparatus may further include (c) a Generator of a Generative Adversarial Network, GAN, for processing of the audio data, wherein the Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation, and wherein the apparatus may further include one or more processors configured to perform a method of generating processed audio data from an audio bitstream using a Generator of a Generative Adversarial Network, GAN, for processing of the audio data.

In some embodiments, the apparatus may further include a core decoder to core decode the received audio bitstream.

In some embodiments, the received audio bitstream may further include metadata indicative of a truncation mode that shall be used, and the apparatus may further include a demultiplexer for demultiplexing the received audio bitstream.

In accordance with a fourth aspect of the present disclosure there is provided a computer program product comprising a computer-readable storage medium with instructions adapted to cause a device to carry out a method for setting up a decoder for generating processed audio data from an audio bitstream, when executed by a device having processing capability.

In accordance with a fifth aspect of the present disclosure there is provided a computer program product comprising a computer-readable storage medium with instructions adapted to cause a device to carry out a method of generating processed audio data from an audio bitstream using a Generator of a Generative Adversarial Network, GAN, when executed by a device having processing capability.

In accordance with a sixth aspect of the present disclosure there is provided a system of an apparatus for generating processed audio data from an audio bitstream and a Generative Adversarial Network comprising a Generator and a Discriminator, wherein the system is configured to perform a method for setting up a decoder for generating processed audio data from an audio bitstream.

In accordance with a seventh aspect of the present disclosure there is provided a system of an apparatus for encoding audio data in an audio bitstream and an apparatus for generating processed audio data from an audio bitstream.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Truncation

Truncation refers generally to an operation of re-sampling values of a distribution that fall outside a pre-determined range to fall inside said pre-determined range. If audio data are input into a Generator of a Generative Adversarial Network, GAN, the bottleneck layer of the Generator maps to a latent feature space representation. The bottleneck features or latent feature space representation has the dimension: [number of channels (or filter outputs)×time]. Concatenating a random noise vector z, the random noise vector z also having the same dimension as the bottleneck features, along the channel-dimension yields a concatenated distribution as a result of said concatenation. Methods and apparatus as described exploit to truncate said concatenated distribution within a desired range. This allows to fine-tune the enhancement of audio by a Generator and to thus improve towards a trade-off between quality and variety.

Figure 1:
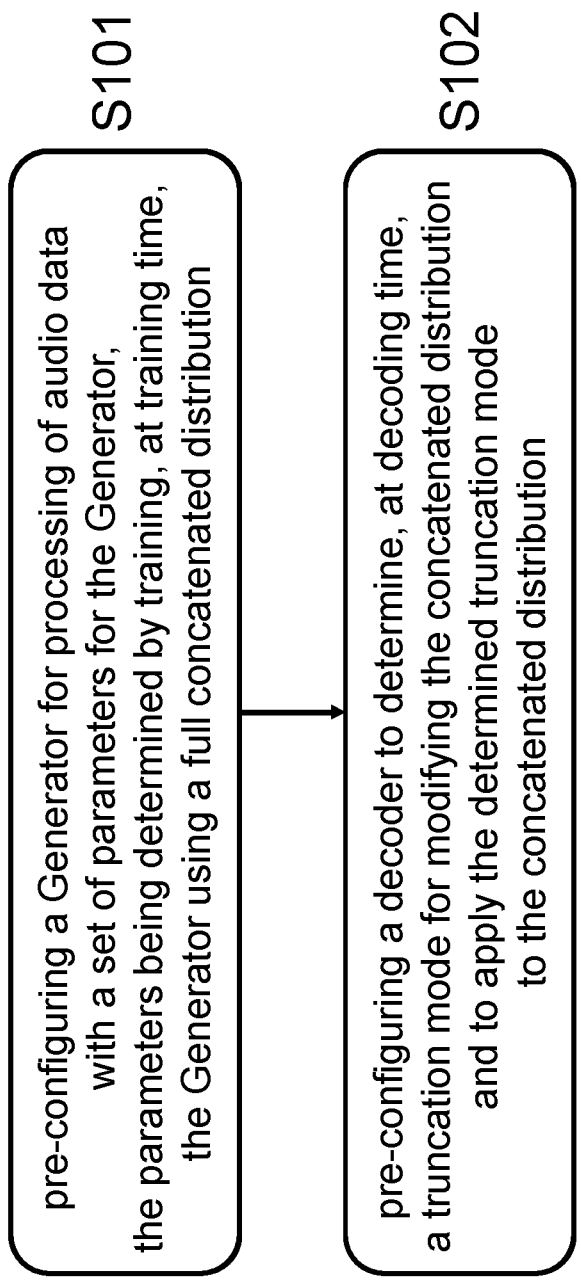
FIG. 1 illustrates an example of a method for setting up a decoder for generating processed audio data from an audio bitstream.

Method for Setting Up a Decoder for Generating Processed Audio Data from an Audio Bitstream Referring to the example of FIG. 1, a method for setting up a decoder for generating processed audio data from an audio bitstream is illustrated. The decoder comprises a Generator of a Generative Adversarial Network, GAN, for processing of the audio data. In step S101, the Generator is pre-configured for processing of the audio data with a set of parameters for the Generator. The parameters are determined by training, at training time, as described further below. The Generator uses a full concatenated distribution for processing of the audio data. Full concatenated distribution, as used herein, refers to a concatenated distribution that has not been truncated (modified).

The Generator includes an encoder stage and a decoder stage, wherein the encoder stage and the decoder stage each include a plurality of layers with one or more filters in each layer, with a last layer of the encoder stage being a bottleneck layer mapping to a coded audio feature space (latent feature space representation), wherein the Generator is adapted to concatenate features, in the coded audio feature space, with a random noise vector z to obtain the concatenated distribution based on a result of the concatenation. The architecture of a Generator will be described in more detail further below.

In step S102, as a further step of the method, the decoder is pre-configured to determine, at decoding time, a truncation mode for modifying the concatenated distribution and to apply the determined truncation mode to the concatenated distribution.

As described above, the term "truncation", as used herein, refers to an operation of re-sampling values of a distribution (in this case the concatenated distribution) that fall outside a pre-determined range to fall inside said pre-determined range. Further, the term "decoding time" as used herein refers to the operation of the decoder during inference, whereas the term "training time" refers to training the Generator as described further below. "Training time" may be performed prior to "decoding time" one or more times to obtain a trained Generator.

Figure 2:
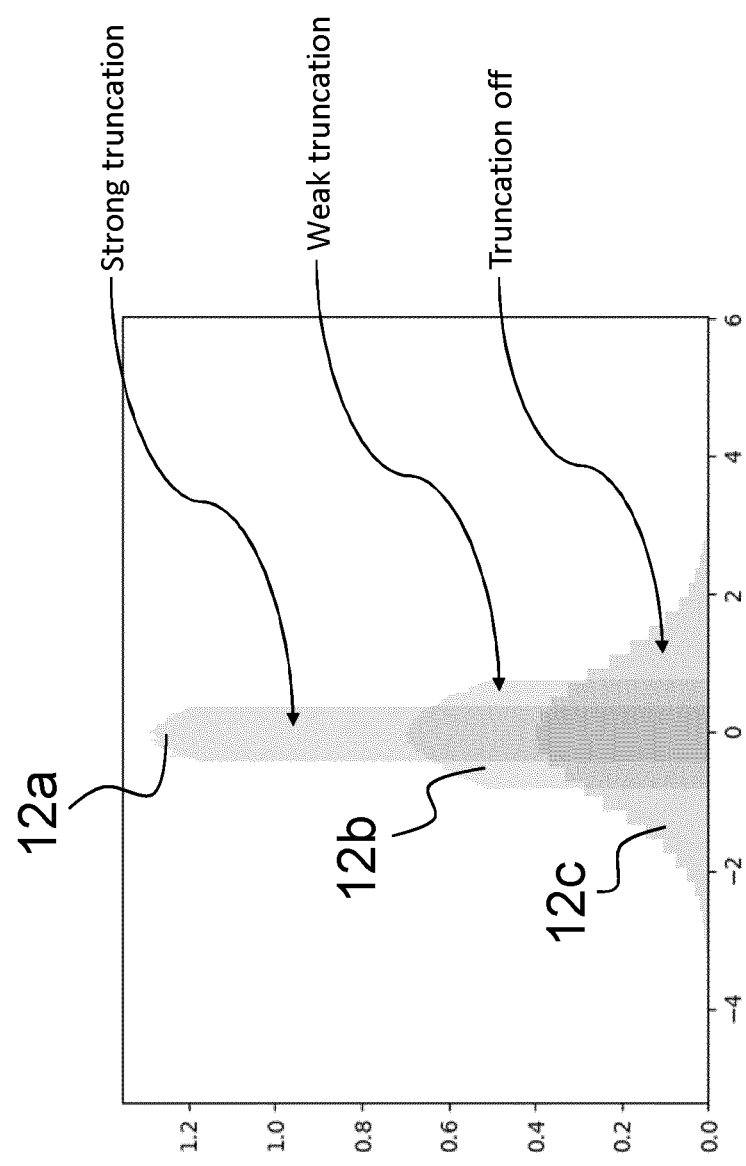
FIG. 2 illustrates schematically two examples of truncated concatenated distributions and an example of a full concatenated distribution.

Referring to the example of FIG. 2, two examples of truncated concatenated distributions and an example of a full concatenated distribution are illustrated. In an embodiment, the decoder may be pre-configured to determine, at decoding time, the truncation mode for modifying the concatenated distribution out of two or more truncation modes. The two or more truncation modes, in an embodiment, may include a truncation mode of truncation off, 12c, a truncation mode of weak truncation, 12b, a truncation mode of intermediate truncation, and a truncation mode of strong truncation, 12a. In the truncation mode of truncation off, 12c, no truncation may be performed on the concatenated distribution. In the truncation mode of weak truncation, 12b, a truncation may be performed on the concatenated distribution within a comparably broad range, i.e. only a few values may fall outside the range. In the truncation modes of intermediate and strong truncation, 12a, the range defined for the truncation operation may be narrower, i.e. a larger number of values may fall outside the range.

In an embodiment, in step S102, the decoder may be pre-configured to determine, at decoding time, the truncation mode based on audio content and/or bitstream parameters of the audio bitstream. The audio content may include, in an embodiment, one or more of applause, speech, music, and effects. The bitstream parameters may include, in an embodiment, one or more of an indication of a bit-rate and an indication of an audio codec type.

In an embodiment, in step S102, the decoder may be pre-configured to determine, at decoding time, the truncation mode of truncation off when the audio content includes applause. In step S102, in an embodiment, the decoder may be pre-configured to determine, at decoding time, one of the truncation modes of weak truncation, intermediate truncation or strong truncation when the audio content includes speech, music and/or effects. This difference in truncation modes originates from the fact that compared to speech, music and/or effects, applause is generally noisy.

In an embodiment, in step S102, the decoder may be pre-configured to determine, at decoding time, the truncation mode of truncation off when the indication of the bit-rate indicates a low bit-rate. In step S102, in an embodiment, the decoder may be pre-configured to determine, at decoding time, one of the truncation modes of weak truncation, intermediate truncation or strong truncation when the indication of the bit-rate indicates a high bit-rate. This is due to the fact that, at low bitrate, there is a weak/sparse conditioning signal as low bitrate coding may introduce spectral holes, whereas at high bitrate, there is a strong/dense conditioning signal. A conditioning (guiding) signal (or conditioning parameters) may be input into the Generator to enable a more meaningful processing of the audio data as compared to an unconditional GAN where the Generator processes audio data based on random noise only. Herein, the conditioning signal may be the decoded audio signal (decoded audio data).

In an embodiment, in step S102, the decoder may be pre-configured to determine the truncation mode based on an indication of a truncation mode that shall be used, the indication being included in metadata of the audio bitstream. In this, it may be possible to implement encoder control in the determination of the truncation mode.

In an embodiment, applying the determined truncation mode to the concatenated distribution may include applying a cut off to the concatenated distribution according to a truncation range to obtain a truncation region and resampling all values outside the truncation region to lie inside the truncation region.

A truncation range may be defined by setting specific upper and lower thresholds for the truncation, for example. These upper and lower thresholds may define the upper and lower cut off as illustrated in the example of FIG. 2. The truncation region may then be said to be the region lying in between the upper and lower cut off performed at the upper and lower threshold values.

In an embodiment, the truncation mode of weak truncation may be set to apply a truncation range extending from −0.8 to +0.8. The values of −0.8 and +0.8 correspond to respective normalized values defining the upper and lower threshold values for applying the cut off.

The truncation mode of intermediate truncation, in an embodiment, may be set to apply a truncation range extending from −0.5 to +0.5. Alternatively, or additionally, in an embodiment, the truncation mode of strong truncation may be set to apply a truncation range extending from −0.4 to +0.4.

While the type of the full concatenated distribution (untruncated, truncation mode of truncation off) may not be limited, in an embodiment, the full concatenated distribution may be a Gaussian distribution or a Laplace distribution. The full concatenated distribution may further vary with the audio data fed into the Generator.

Architecture of the Generator

While the architecture of a Generator is generally not limited, as already described above, the Generator includes an encoder stage and a decoder stage. The encoder stage and the decoder stage of the Generator may be fully convolutional, wherein the decoder stage may mirror the encoder stage. The encoder stage as well as the decoder stage each include a plurality of layers with one or more filters (e.g., a plurality of filters) in each layer, wherein a bottleneck layer (last layer) of the encoder stage of the Generator maps to a coded audio feature space (latent feature space representation) between the encoder stage and the decoder stage, and wherein the Generator is adapted to concatenate features, in the coded audio feature space, with a random noise vector z to obtain a concatenated distribution based on a result of the concatenation.

For example, the encoder stage as well as the decoder stage of the Generator may each include a number of L layers with a number of N filters in each layer L. L may be a natural number $\geq 1$ and N may be a natural number $\geq 1$. The size (also known as kernel size) of the N filters is not limited and may be chosen according to the requirements of the enhancement of the quality of raw audio data by the Generator. The filter size may, however, be the same in each of the L layers.

Figure 3:
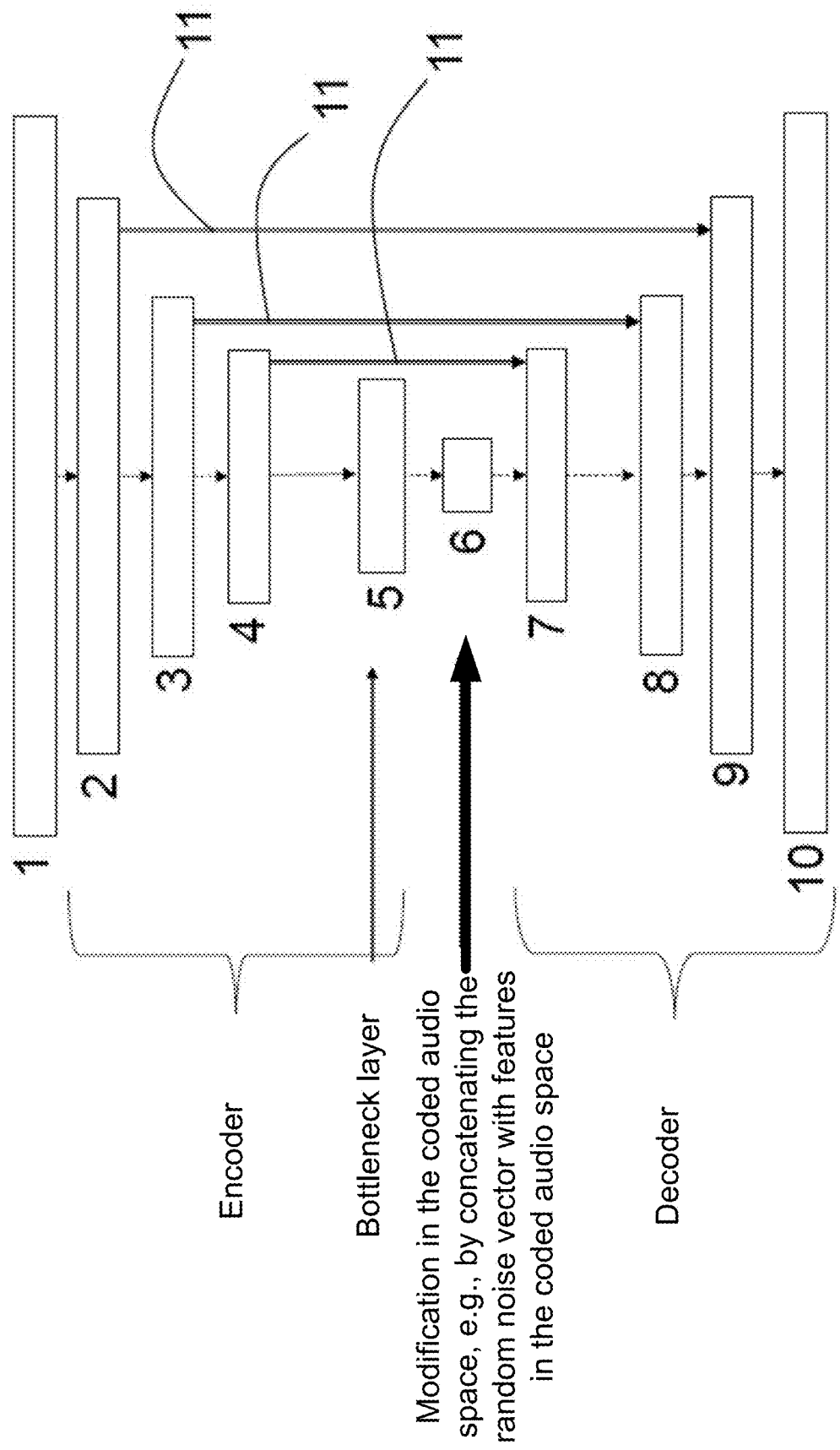
FIG. 3 illustrates an example of a Generator architecture.

Referring now to the example of FIG. 3, which illustrates schematically a non-limiting example of an architecture of a Generator, audio data may be input into the Generator in a first step, 1. The first illustrated encoder layer, 2, layer number L=1, may include N=16 filters having a filter size of 31. The second illustrated encoder layer, 3, layer number L=2, may include N=32 filters having a filter size of 31. Subsequent layers are omitted for reasons of clarity and conciseness. The third illustrated encoder layer, 4, layer number L=11, may include N=512 filters having a filter size of 31.

In each layer the number of filters may thus increase, i.e., the number of filters may increase towards deeper layers of the Generator. In one embodiment, each of the filters may operate on the audio data input into each of the encoder layers with a stride of >1. Each of the filters may, for example, operate on the audio data input into each of the encoder layers with a stride of 2. Thus, a learnable down-sampling by a factor of 2 may be performed. Alternatively, the filters may also operate with a stride of 1 in each of the encoder layers followed by a down-sampling by a factor of 2 (as in known signal processing). Alternatively, for example, each of the filters may operate on the audio data input into each of the encoder layers with a stride of 4, which may halve the overall number of layers in the Generator.

In at least one encoder layer and in at least one decoder layer of the Generator, a non-linear operation may be performed in addition as an activation. In one embodiment, the non-linear operation may include one or more of a parametric rectified linear unit (PReLU), a rectified linear unit (ReLU), a leaky rectified linear unit (LReLU), an exponential linear unit (eLU) and a scaled exponential linear unit (SeLU). In the example of FIG. 3, the non-linear operation is based on PReLU.

As is schematically illustrated in FIG. 3, the respective decoder layers, 7, 8, 9, mirror the encoder layers, 2, 3, 4. While the number of filters in each layer and the filter size in each layer may be the same in the decoder stage as in the encoder stage, up-sampling of the audio signal in the decoder stage may be performed by two alternative approaches. In one embodiment, fractionally-strided convolution (also known as transposed convolution) operations may be used in the layers 7, 8, 9, of the decoder stage. Alternatively, in each layer of the decoder stage the filters may operate on the audio data input into each layer with a stride of 1, after up-sampling and interpolation is performed as in conventional signal processing with the up-sampling factor of 2.

An output layer (convolution layer), 10, may subsequently follow the last layer of the decoder stage before the enhanced audio data are output. In this example, the output layer, 10, may include N=1 filters having a filter size of 31.

In the output layer, 10, the activation may be different to the activation performed in the at least one of the encoder layers and the at least one of the decoder layers. The activation may be based, for example, on a tan h operation.

In between the encoder stage and the decoder stage, the audio data may be modified to generate the enhanced audio data. The modification may be based on the bottleneck layer, 5, of the encoder stage that maps to the coded audio feature space, 6. The bottleneck layer (or rather, the coded audio feature space) captures the most dominant features of the input (coded) audio data. The modification in the coded audio feature space, 6, may be done by concatenating the random noise vector z with the features in the coded audio feature space, 6.

Additionally, metadata may be input at this point to modify the enhanced audio data. In this, generation of the enhanced audio data may be conditioned based on given metadata, for example, companding metadata.

Skip connections, 11, may exist between homologous layers of the encoder stage and the decoder stage. In this, the coded audio feature space, 6, described above may be bypassed preventing loss of information. Skip connections, 11, may be implemented using one or more of concatenation and signal addition. Due to the implementation of skip connections, 11, the number of filter outputs may be "virtually" doubled.

Referring to the example in FIG. 3, the architecture of the Generator may be summarized as follows:

1/Input: dynamic range reduced raw audio data
2/encoder layer L=1: filter number N=16, filter size=31, activation=PreLU
3/encoder layer L=2: filter number N=32, filter size=31, activation=PreLU
.
.
.
4/encoder layer L=11: filter number N=512, filter size=31
5/bottleneck layer: filter number N=1024, filter size=31
6/coded audio feature space
7/decoder layer L=1: filter number N=512, filter size=31
.
.
.
8/decoder layer L=10: filter number N=32, filter size=31, activation PreLU
9/decoder layer L=11: filter number N=16, filter size=31, activation PreLU
10/output layer: filter number N=1, filter size=31, activation tan h output enhanced audio data
11/skip connections The above presented architecture merely represents an example Depending on the application, the number of layers in the encoder stage and in the decoder stage of the Generator may be down-scaled or up-scaled, respectively.

Training of the Generator In an embodiment, step S101, as illustrated in the example of FIG. 1, may include training the Generator using the full concatenated distribution. In step S101, in an embodiment, the set of parameters for the Generator may be determined by training the Generator in a GAN setting including the Generator and a Discriminator. A GAN setting generally includes the Generator G and a Discriminator D which are trained by an iterative process. During training in the Generative Adversarial Network setting, the Generator G generates a processed audio training signal x* based on an audio training signal, $\tilde{x}$, (core encoded and core decoded) derived from an original audio signal, x, using the full concatenated distribution, the full concatenated distribution being obtained as a result of concatenating the features in the coded audio feature space with a random noise vector z. Additionally, metadata may be input into the Generator and processing the raw audio training signal, $\tilde{x}$, may be based additionally on the metadata. During training, the generation of the processed audio training signal, x*, may thus be conditioned based on the metadata.

During training, the Generator tries to output a processed audio training signal, x*, that is indistinguishable from the original audio signal, x. The Discriminator is one at a time fed with the processed audio training signal, x*, and the original audio signal, x, and judges in a fake/real manner whether the input signal is the processed audio training signal, x*, or the original audio signal, x. In this, the Discriminator tries to discriminate the original audio signal, x, from the processed audio training signal, x*. During the iterative process, the Generator then tunes its parameters to generate better and better processed audio training signals, x*, as compared to the original audio signals, x, and the Discriminator learns to better judge between the processed audio training signal, x*, and the original audio signal, x.

It shall be noted that the Discriminator may be trained first in order to train the Generator in a final step. Training and updating the Discriminator may involve maximizing the probability of assigning high scores to original audio signals, x, and low scores to processed audio training signals, x*. The goal in training of the Discriminator may be that the original audio signal, x, is recognized as real while the processed audio training signal, x*, (generated signal) is recognized as fake. While the Discriminator is trained and updated, the parameters of the Generator may be kept fixed.

Training and updating the Generator may involve minimizing the difference between the original audio signal, x, and the processed audio training signal, x*. The goal in training the Generator may be to achieve that the Discriminator recognizes processed audio training signals, x*, as real.

Figure 4:
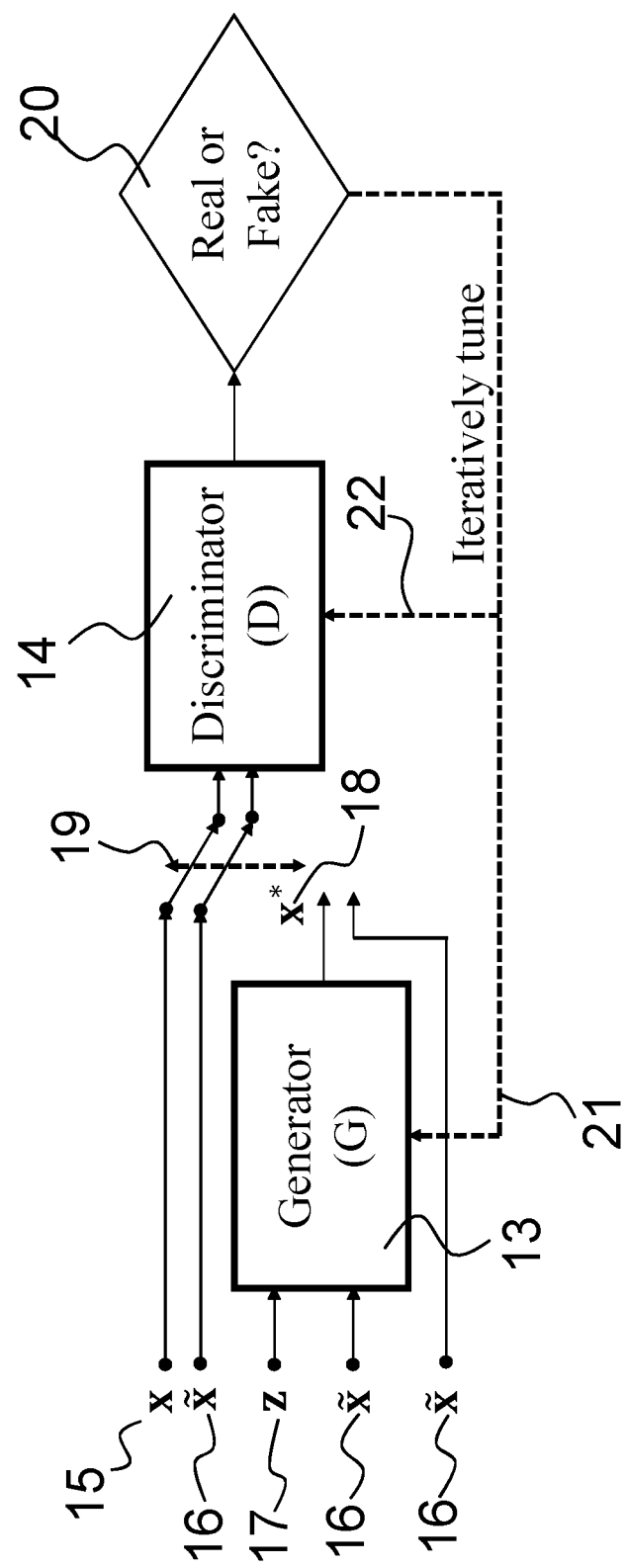
FIG. 4 illustrates an example of determining a set of parameters for the Generator by training the Generator in a GAN setting including the Generator and a Discriminator.

Referring now to the example of FIG. 4, training of a Generator, G, 13, in a Generative Adversarial Network setting is described in more detail. Training of the Generator, G, 13, may involve the following.

An original audio signal, x, 15, may be subjected to core encoding and core decoding to obtain a raw audio training signal, $\tilde{x}$, 16. The raw audio training signal, $\tilde{x}$, 16, and a random noise vector, z, 17, are then input into the Generator G, 13. Based on the input, the Generator, G, 13, then generates the processed audio training signal, x*, 18, using the full concatenated distribution. In an embodiment, during training the Generator, G, 13, the truncation mode of truncation off may thus be applied. Additionally, the Generator, G, 13, may be trained using metadata as additional input in the coded audio feature space to modify the processed audio training signal, x*, 18. One at a time, the original audio signal, x, 15, from which the raw audio training signal, $\tilde{x}$, 16, has been derived, and the processed audio training signal, x*, 18, are input, 19, into the Discriminator, D, 14. As additional information, also the raw audio training signal, x̃, 16, may be input each time into the Discriminator D, 14. The Discriminator D, 14 then judges, 20, whether the input signal is the processed audio training signal, x*, 18, (fake) or the original audio signal, x, 15, (real).

In a next step, the parameters of the Generator, G, 13, are then tuned until the Discriminator, D, 14, can no longer distinguish the processed audio training signal, x*, 18, from the original audio signal, x, 15. This may be done in an iterative process, 21.

Judging by the Discriminator, D, 14, may be based on one or more of a perceptually motivated objective function as according to the following equation (1):

$$\mathcal{L}_G = \frac{1}{2}\mathbb{E}_{z \sim p_z(z), \tilde{x} \sim p_{data}(\tilde{x})}\left[(D(x^*, \tilde{x}) - 1)^2\right] + \tag{1}$$

$$\lambda \|x^* - x\|_1 + \mu \frac{1}{M}\sum_{m=1}^{M} L_{sc}^m(x, x^*) + \vartheta \frac{1}{M}\sum_{m=1}^{M} L_{mag}^m(x, x^*)$$

As can be seen from the first term in equation (1), a conditioned Generative Adversarial Network setting has been applied by inputting the audio training signal x̃ as additional information into the Discriminator.

The last two terms in the above equation (1) may be referred to as a multi-resolution STFT loss term. The multi-resolution STFT loss may be said to be the sum of different STFT-based loss functions using different STFT parameters. $L_{sc}^m$, (spectral convergence loss) and $L_{mag}^m$ (log-scale STFT magnitude loss) may apply the STFT-based loss at M different resolutions with number of FFT bins ∈ {512, 1024, 2048}, hop sizes ∈ {50, 120, 240}, and lastly window lengths ∈ {240, 600, 1200}, respectively. Results showed that for handling general audio (i.e. any content type), the multi-resolution STFT loss term provides quality improvement.

The second term in equation (1) is a 1-norm distance scaled by the factor lambda λ. The value of lambda may be chosen of from 10 to 100 depending on the application and/or signal length that is input into the Generator, G, 13. For example, lambda may be chosen to be λ=100. Furthermore, the scaling (it and for the multi-resolution STFT loss term may be set to the same value as lambda.

Training of the Discriminator, D, 14, in the Generative Adversarial Network setting may follow the same general iterative process, 22, as described above for the training of the Generator, G, 13, in response to inputting, one at a time, 19, the processed audio training signal x*, 18, and the original audio signal, x, 15, together with the raw audio training signal, x̃, 16, into the Discriminator, D, 14, except that in this case the parameters of the Generator, G, 13, may be fixed while the parameters of the Discriminator, D, 14, may be varied. The training of the Discriminator, D, 14, may be described by the following equation (2) that enables the Discriminator, D, 14 to determine processed audio training signals, x*, 18, as fake:

$$\min_D V_{LS-GAN}(D) = \tag{2}$$

$$\frac{1}{2}\mathbb{E}_{x, \tilde{x} \sim p_{data}(x, \tilde{x})}\left[(D(x, \tilde{x}) - 1)^2\right] + \frac{1}{2}\mathbb{E}_{z \sim p_z(z), \tilde{x} \sim p_{data}(\tilde{x})}\left[D(x^*, \tilde{x})^2\right]$$

In the above case, also the least squares approach (LS) and a conditioned Generative Adversarial Network setting has been applied by inputting the core decoded raw audio training signal, x̃, as additional information into the Discriminator.

Besides the least squares approach, also other training methods may be used for training the Generator and the Discriminator in a Generative Adversarial Network setting. The present disclosure is not limited to a particular training method. Alternatively, or additionally, the so-called Wasserstein approach may be used. In this case, instead of the least squares distance, the Earth Mover Distance also known as Wasserstein Distance may be used. In general, different training methods make the training of the Generator and the Discriminator more stable. The kind of training method applied, does, however, not impact the architecture of the Generator.

Architecture of the Discriminator

While the architecture of the Discriminator is not limited, the architecture of the Discriminator may follow the same one-dimensional convolutional structure as the encoder stage of the Generator described above. The Discriminator architecture may thus mirror the encoder stage of the Generator. The Discriminator may thus also include a plurality of layers with one or more filters in each layer. For example, the Discriminator may include a number of L layers, wherein each layer may include a number of N filters. L may be a natural number ≥1 and N may be a natural number ≥1. The size of the N filters is not limited and may also be chosen according to the requirements of the Discriminator. The filter size may, however, be the same in each of the L layers. A non-linear operation performed in at least one of the encoder layers of the Discriminator may include LeakyReLU.

Following the encoder stage, the Discriminator may include an output layer. The output layer may have N=1 filters having a filter size of 1. In this, the filter size of the output layer may be different from the filter size of the encoder layers. The output layer may thus be a one-dimensional convolution layer that does not down-sample hidden activations. This means that the filter in the output layer may operate with a stride of 1 while all previous layers of the encoder stage of the Discriminator may use a stride of 2. Alternatively, each of the filters in the previous layers of the encoder stage may operate with a stride of 4. This may enable to halve the overall number of layers in the Discriminator.

The activation in the output layer may be different from the activation in the at least one of the encoder layers. The activation may be sigmoid. However, if a least squares training approach is used, sigmoid activation may not be required and is therefore optional.

The architecture of the Discriminator may exemplarily be summarized as follows:
  input enhanced dynamic range reduced audio training signal or original dynamic range reduced audio signal
  encoder layer L=1: filter number N=16, filter size=31, activation=Leaky ReLU
  encoder layer L=2: filter number N=32, filter size=31, activation=Leaky ReLU
  .
  .
  .
  encoder layer L=11: filter number N=1024, filter size=31, activation=Leaky ReLU
  output layer: filter number N=1, filter size=1, optionally: activation=sigmoid Output: judgement on the input as real/fake in relation to the original dynamic range reduced audio signal and the enhanced dynamic range reduced audio training signal generated by the Generator.

The above presented architecture merely represents an example. Depending on the application, the number of layers in the encoder stage of the Discriminator may be down-scaled or up-scaled, respectively.

Figure 5:
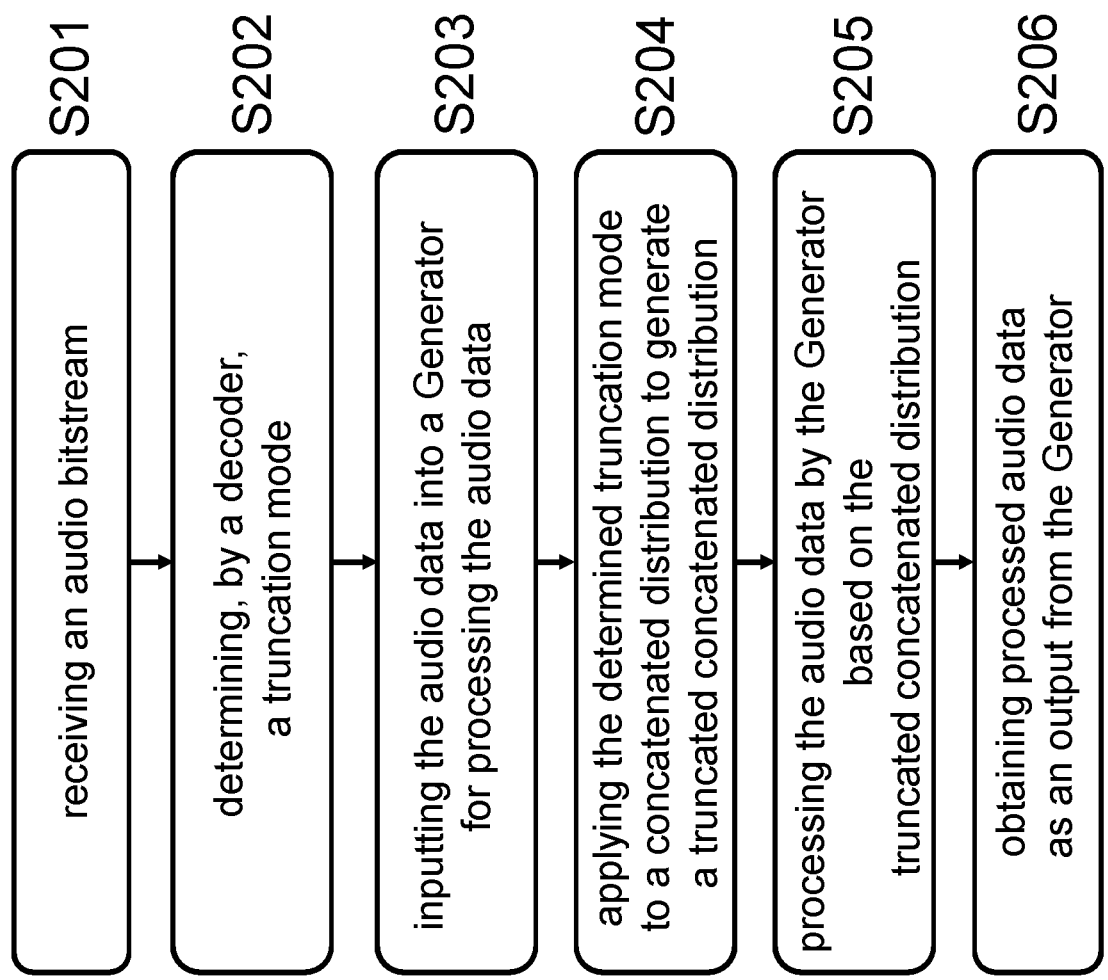
FIG. 5 illustrates an example of a method of generating processed audio data from an audio bitstream using a Generator of a Generative Adversarial Network, GAN.

Method for Setting Up a Decoder for Generating Processed Audio Data from an Audio Bitstream Referring now to the example of FIG. 5, a method of generating processed audio data from an audio bitstream using a Generator of a Generative Adversarial Network, GAN, is illustrated. The Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation.

In step S201, an audio bitstream is received. In step S202, the decoder then determines a truncation mode. The audio data are input into the Generator in step S203 for processing the audio data. In step S204, the determined truncation mode is then applied to the concatenated distribution to generate a truncated concatenated distribution. Processing the audio data by the Generator in step S205 is based on the truncated concatenated distribution. As an output from the Generator, the processed audio data are then obtained in step S206.

It is to be noted that the method as described may be applied to uncoded or coded audio. Also, the format of the audio data is not limited. The method may also be applied, for example, in the AC-4 companded domain which may involve additional dynamic range conversion. In an embodiment, the method may thus further include core decoding the received audio bitstream.

In an embodiment, the truncation mode may be determined, by the decoder, out of two or more truncation modes. The two or more truncation modes, in an embodiment, may include a truncation mode of truncation off, a truncation mode of weak truncation, a truncation mode of intermediate truncation and a truncation mode of strong truncation. It is referred to the example of FIG. 2 and the details given above.

In an embodiment, in step S202, the truncation mode may be determined, by the decoder, based on audio content and/or bitstream parameters. The audio content, in an embodiment, may include one or more of applause, speech, music, and effects. In an embodiment, the bitstream parameters may include one or more of an indication of a bit-rate and an indication of an audio codec type.

In an embodiment, in step S202, the truncation mode of truncation off may be determined, by the decoder, when the audio content includes applause. In this case, the truncated concatenated distribution corresponds to the full concatenated distribution. In an embodiment, in step S202, one of the truncation modes of weak truncation, intermediate truncation or strong truncation may be determined, by the decoder, when the audio content includes speech, music and/or effects.

In step S202, in an embodiment, the truncation mode of truncation off may be determined, by the decoder, when the indication of the bit-rate indicates a low bit-rate. Further, in an embodiment, in step S202, one of the truncation modes of weak truncation, intermediate truncation or strong truncation may be determined, by the decoder, when the indication of the bit-rate indicates a high bit-rate.

In an embodiment, in step S202 applying the determined truncation mode to the concatenated distribution may include applying a cut off to the concatenated distribution according to a truncation range to obtain a truncation region and resampling all values outside the truncation region to lie inside the truncation region as described in more detail above.

In an embodiment, the truncation mode of weak truncation may be set to apply a truncation range extending from −0.8 to +0.8. Alternatively, or additionally, in an embodiment, the truncation mode of intermediate truncation may be set to apply a truncation range extending from −0.5 to +0.5. Further, alternatively, or additionally, in an embodiment, the truncation mode of strong truncation may be set to apply a truncation range extending from −0.4 to +0.4.

While the type of the concatenated distribution is not limited, in an embodiment, the concatenated distribution may be a Gaussian distribution or a Laplace distribution.

In an embodiment, the audio bitstream may include metadata, wherein an indication of a truncation mode that shall be used by the decoder may be included in the metadata. In this, encoder control can be additionally implemented.

Figure 6:
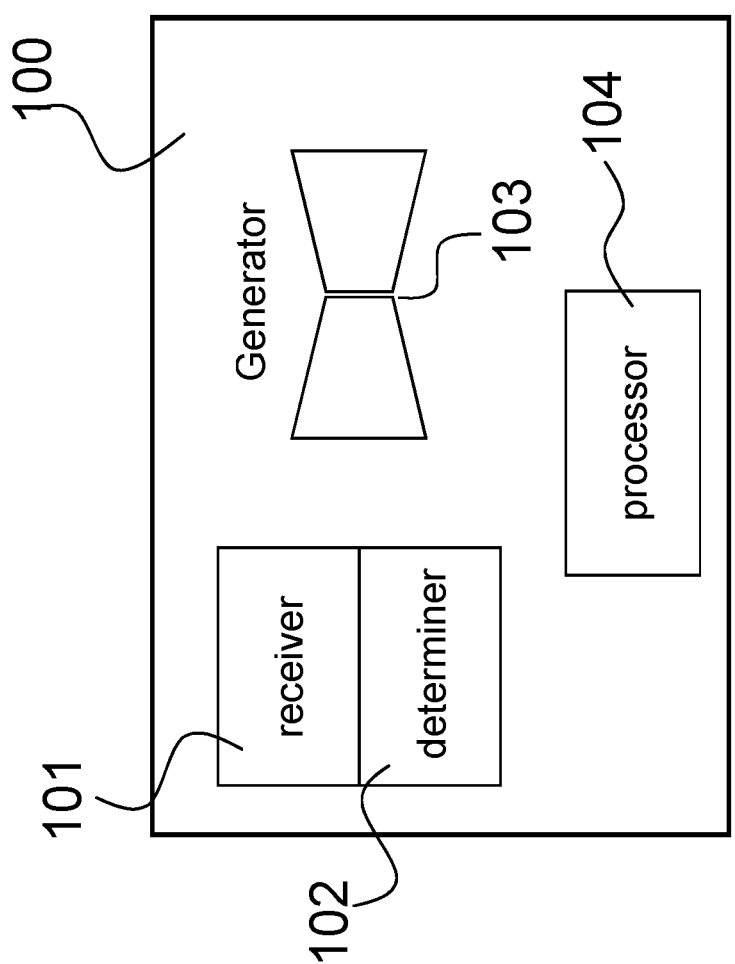
FIG. 6 illustrates an example of an apparatus for generating processed audio data from an audio bitstream.

Referring to the example of FIG. 6, the above described method may be implemented by an apparatus for generating processed audio data from an audio bitstream. The apparatus, 100, may include a receiver, 101, for receiving the audio bitstream and a determiner, 102, for determining a truncation mode. The apparatus, 100, may further include a Generator, 103, of a Generative Adversarial Network, GAN, for processing of the audio data, wherein the Generator, 103, includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator, 103, is adapted to concatenate features, in the coded audio feature space, with a random noise vector z to obtain a concatenated distribution based on a result of the concatenation. The apparatus, 100, may further include one or more processors, 104, configured to perform the above described method.

In an embodiment, the apparatus may further include a core decoder to core decode the received audio bitstream. In an embodiment, the received audio bitstream may further include metadata indicative of a truncation mode that shall be used and the apparatus may further include a demultiplexer for demultiplexing the received audio bitstream.

The above described method may also be implemented by a system of an apparatus for encoding audio data in an audio bitstream and the apparatus for generating processed audio data from an audio bitstream.

Figure 7:
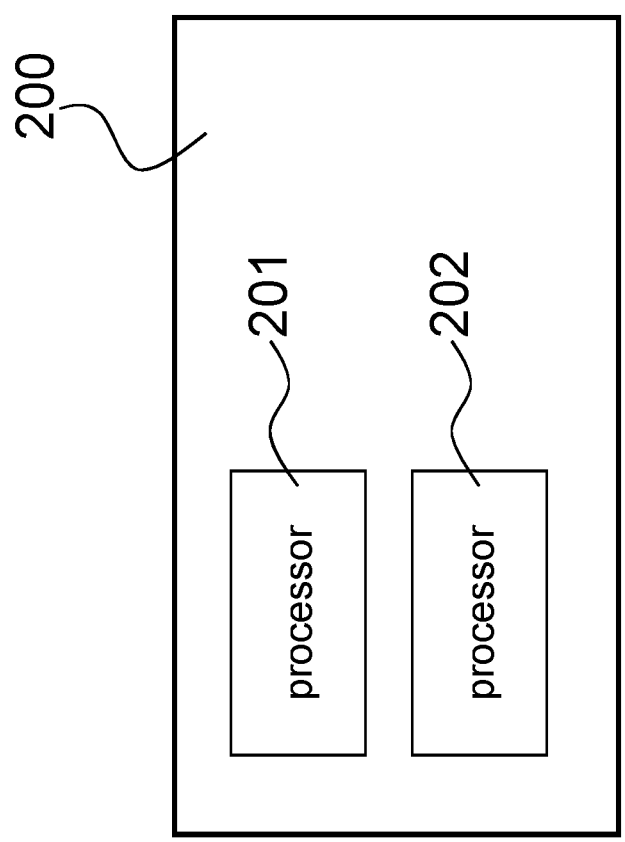
FIG. 7 illustrates an example of a device having processing capability.

It is to be noted that all methods as described herein may, alternatively, or additionally also be implemented on a computer program product comprising a computer-readable storage medium with instructions adapted to cause the device to carry out said methods when executed by a device having processing capability. A device, 200, including two processors, 201, 202, is illustrated in the example of FIG. 7.

All methods as described herein may also be implemented by a system of the apparatus for generating processed audio data from an audio bitstream and a Generative Adversarial Network comprising a Generator and a Discriminator.

Interpretation

Unless specifically stated otherwise, as apparent from the following discussions, it is appreciated that throughout the disclosure discussions utilizing terms such as "processing", "computing", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an example embodiment" means that a particular feature, structure or characteristic described in connection with the embodiment is included in at least one embodiment of the present disclosure. Thus, appearances of the phrases "in one embodiment", "in some embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A method for setting up a decoder for generating processed audio data from an audio bitstream, the decoder comprising a Generator of a Generative Adversarial Network, GAN, for processing of the audio data, wherein the Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation, wherein the method includes the steps of:
   (a) pre-configuring the Generator for processing of audio data with a set of parameters for the Generator, the parameters being determined by training, at training time, the Generator using a full concatenated distribution; and
   (b) pre-configuring the decoder to determine, at decoding time, a truncation mode for modifying the concatenated distribution and to apply the determined truncation mode to the concatenated distribution.

2. The method of claim 1, wherein in step (b) the decoder is pre-configured to determine the truncation mode based on an indication of a truncation mode that shall be used, the indication being included in metadata of the audio bitstream.

3. The method of claim 1, wherein applying the determined truncation mode to the concatenated distribution includes:
   applying a cut off to the concatenated distribution according to a truncation range to obtain a truncation region; and
   resampling all values outside the truncation region to lie inside the truncation region.

4. The method of claim 1, wherein in step (a) the set of parameters for the Generator is determined by training the Generator in a GAN setting including the Generator and a Discriminator, wherein the training includes the steps of:
   (a) inputting an audio training signal into the Generator;
   (b) generating, by the Generator, a processed audio training signal based on the audio training signal using the full concatenated distribution;
   (c) inputting, one at a time, the processed audio training signal and a corresponding original audio signal, from which the audio training signal has been derived, into the Discriminator;
   (d) judging, by the Discriminator, whether the input audio signal is the processed audio training signal or the original audio signal; and (e) iteratively tuning the parameters of the Generator until the Discriminator can no longer distinguish the processed audio training signal from the original audio signal.

5. The method of claim 1, wherein the decoder is pre-configured to determine, at decoding time, the truncation mode for modifying the concatenated distribution out of two or more truncation modes.

6. The method of claim 5, wherein the two or more truncation modes include a truncation mode of truncation off, a truncation mode of weak truncation, a truncation mode of intermediate truncation, and a truncation mode of strong truncation.

7. The method of claim 6, wherein in step (b) the decoder is pre-configured to determine, at decoding time, the truncation mode based on audio content and/or bitstream parameters of the audio bitstream.

8. The method of claim 7, wherein the bitstream parameters include one or more of an indication of a bit-rate and an indication of an audio codec type.

9. The method of claim 7, wherein the audio content includes one or more of applause, speech, music, and effects.

10. The method of claim 9, wherein in step (b) the decoder is pre-configured to determine, at decoding time, the truncation mode of truncation off when the audio content includes applause, or wherein in step (b) the decoder is pre-configured to determine, at decoding time, one of the truncation modes of weak truncation, intermediate truncation or strong truncation when the audio content includes speech, music and/or effects, or wherein in step (b) the decoder is pre-configured to determine, at decoding time, the truncation mode of truncation off when the indication of the bit-rate indicates a low bit-rate, or wherein in step (b) the decoder is pre-configured to determine, at decoding time, one of the truncation modes of weak truncation, intermediate truncation or strong truncation when the indication of the bit-rate indicates a high bit-rate.

11. A method of generating processed audio data from an audio bitstream using a Generator of a Generative Adversarial Network, GAN, for processing of the audio data, wherein the Generator includes an encoder stage and a decoder stage, wherein the encoder stage and the decoder stage each include a plurality of layers with one or more filters in each layer, with a last layer of the encoder stage being a bottleneck layer mapping to a coded audio feature space, wherein the Generator is adapted to concatenate features, in the coded audio feature space, with a random noise vector z to obtain a concatenated distribution based on a result of the concatenation, wherein the method includes the steps of:
(a) receiving the audio bitstream;
(b) determining, by the decoder, a truncation mode;
(c) inputting the audio data into the Generator for processing the audio data;
(d) applying the determined truncation mode to the concatenated distribution to generate a truncated concatenated distribution;
(e) processing the audio data by the Generator based on the truncated concatenated distribution; and
(f) obtaining the processed audio data as an output from the Generator.

12. The method of claim 11, wherein the method further includes core decoding the received audio bitstream.

13. The method of claim 11 wherein in step (d) applying the determined truncation mode to the concatenated distribution includes:
applying a cut off to the concatenated distribution according to a truncation range to obtain a truncation region; and
resampling all values outside the truncation region to lie inside the truncation region.

14. The method of claim 11, wherein the audio bitstream includes metadata, and wherein an indication of a truncation mode that shall be used by the decoder is included in the metadata.

15. The method of claim 11, wherein the truncation mode is determined, by the decoder, out of two or more truncation modes.

16. The method of claim 15, wherein the two or more truncation modes include a truncation mode of truncation off, a truncation mode of weak truncation, a truncation mode of intermediate truncation and a truncation mode of strong truncation.

17. The method of claim 16, wherein in step (b) the truncation mode is determined, by the decoder, based on audio content and/or bitstream parameters.

18. The method of claim 17, wherein the bitstream parameters include one or more of an indication of a bit-rate and an indication of an audio codec type.

19. The method of claim 17, wherein the audio content includes one or more of applause, speech, music, and effects.

20. The method of claim 19, wherein in step (b) the truncation mode of truncation off is determined, by the decoder, when the audio content includes applause, or wherein in step (b) one of the truncation modes of weak truncation, intermediate truncation or strong truncation is determined, by the decoder, when the audio content includes speech, music and/or effects, or wherein in step (b) the truncation mode of truncation off is determined, by the decoder, when the indication of the bit-rate indicates a low bit-rate, or wherein in step (b) one of the truncation modes of weak truncation, intermediate truncation or strong truncation is determined, by the decoder, when the indication of the bit-rate indicates a high bit-rate.

* * * * *